US00RE50315E

(19) United States
(12) Reissued Patent
Zhang

(10) Patent Number: US RE50,315 E
(45) Date of Reissued Patent: Feb. 25, 2025

(54) ADAPTIVE GARBAGE COLLECTION INCLUDING FLASH MEMORY USING AGE AND STALENESS PARAMETERS

(71) Applicant: INNOVATIONS IN MEMORY LLC, Dover, DE (US)

(72) Inventor: Silei Zhang, Fremont, CA (US)

(73) Assignee: INNOVATIONS IN MEMORY LLC, Dover, DE (US)

(21) Appl. No.: 17/471,336

(22) Filed: Sep. 10, 2021

Related U.S. Patent Documents

Reissue of:
(64) Patent No.: 10,409,526
Issued: Sep. 10, 2019
Appl. No.: 14/965,339
Filed: Dec. 10, 2015

U.S. Applications:
(60) Provisional application No. 62/093,169, filed on Dec. 17, 2014.

(51) Int. Cl.
*G06F 3/06* (2006.01)
*G06F 12/02* (2006.01)

(52) U.S. Cl.
CPC ..... *G06F 3/0679* (2013.01); *G06F 3/061* (2013.01); *G06F 3/0616* (2013.01); *G06F 3/0652* (2013.01); *G06F 3/0688* (2013.01); *G06F 12/0246* (2013.01); *G06F 2212/1016* (2013.01); *G06F 2212/1036* (2013.01); *G06F 2212/7205* (2013.01); *G06F 2212/7211* (2013.01)

(58) Field of Classification Search
CPC .... G06F 12/0246; G06F 3/061; G06F 3/0616; G06F 3/0652; G06F 3/0679; G06F 3/0688; G06F 2212/1016; G06F 2212/1036; G06F 2212/7205; G06F 2212/7211; G11C 16/349
See application file for complete search history.

(56) References Cited

U.S. PATENT DOCUMENTS

| | | | | |
|---|---|---|---|---|
| 9,183,134 | B2 * | 11/2015 | Haines | G06F 12/0246 |
| 2009/0138654 | A1 * | 5/2009 | Sutardja | G11C 16/349 711/E12.008 |
| 2011/0029715 | A1 * | 2/2011 | Hu | G11C 16/349 711/170 |
| 2011/0191521 | A1 * | 8/2011 | Araki | G06F 12/0246 711/E12.008 |
| 2012/0023144 | A1 * | 1/2012 | Rub | G06F 12/0246 707/813 |

(Continued)

*Primary Examiner* — B. James Peikari
(74) *Attorney, Agent, or Firm* — Volpe Koenig

(57) ABSTRACT

Data being stored in a block of flash memory system may be characterized as being frequently modified or infrequently modified (hot/cold) based on a heuristic. When performing garbage collection, if the data from hot blocks is consolidated and data from cold blocks is separately consolidated by writing the data to different free blocks, the number of write operations to perform the garbage collection may be reduced. The lower "write amplification" contributes to increasing the lifetime of the memory circuit. When the number of blocks in a pool of previously erased blocks is reduced to a threshold value, a block having data previously stored therein may be selected for garbage collection based on a second heuristic.

8 Claims, 8 Drawing Sheets

AMENDED

(56) References Cited

U.S. PATENT DOCUMENTS

| | | | | |
|---|---|---|---|---|
| 2013/0121075 | A1* | 5/2013 | Hutchison | G11C 11/5628 365/185.11 |
| 2014/0195725 | A1* | 7/2014 | Bennett | G06F 12/0246 711/103 |

* cited by examiner

AMENDED

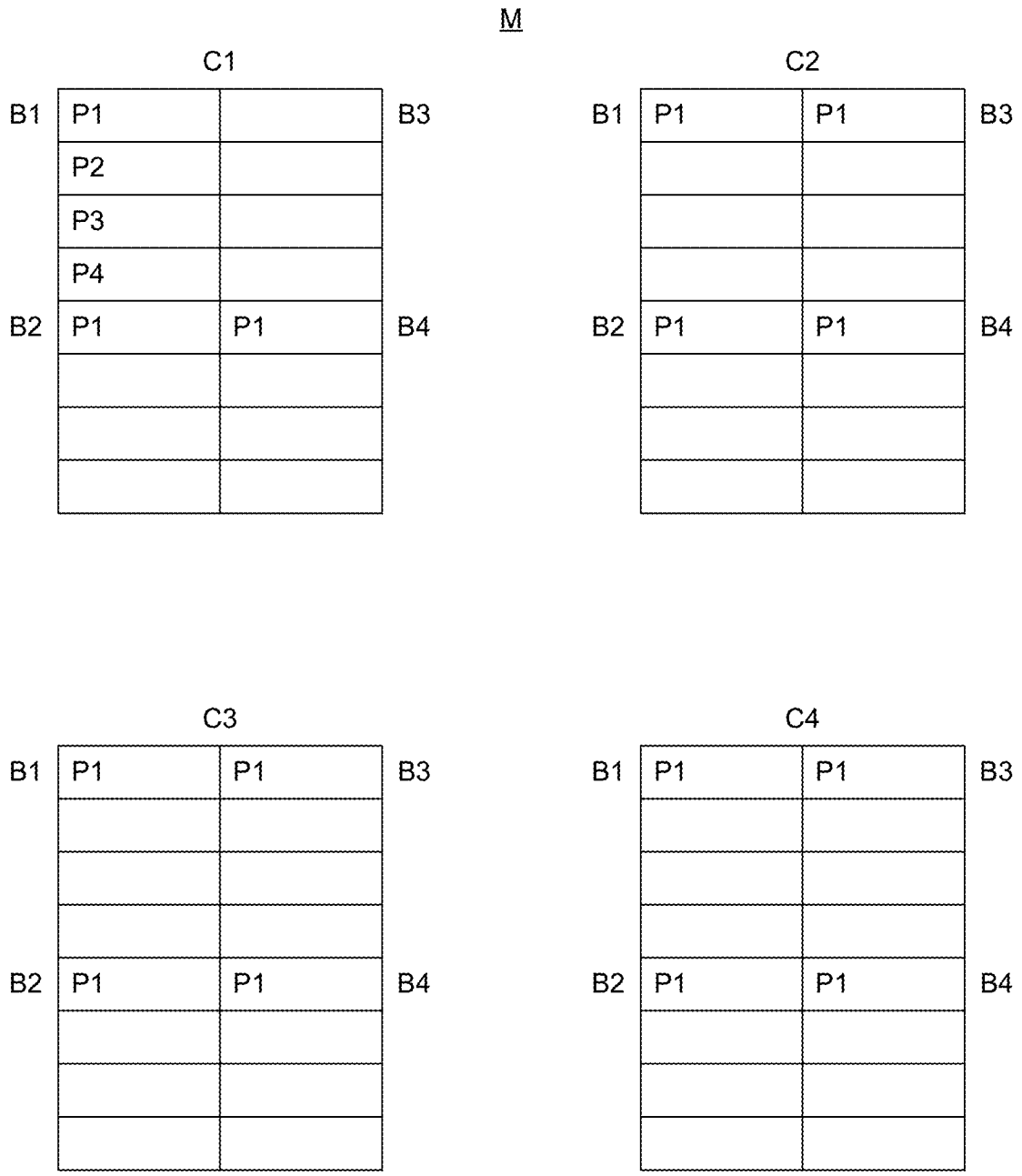
FIG. 2
AMENDED

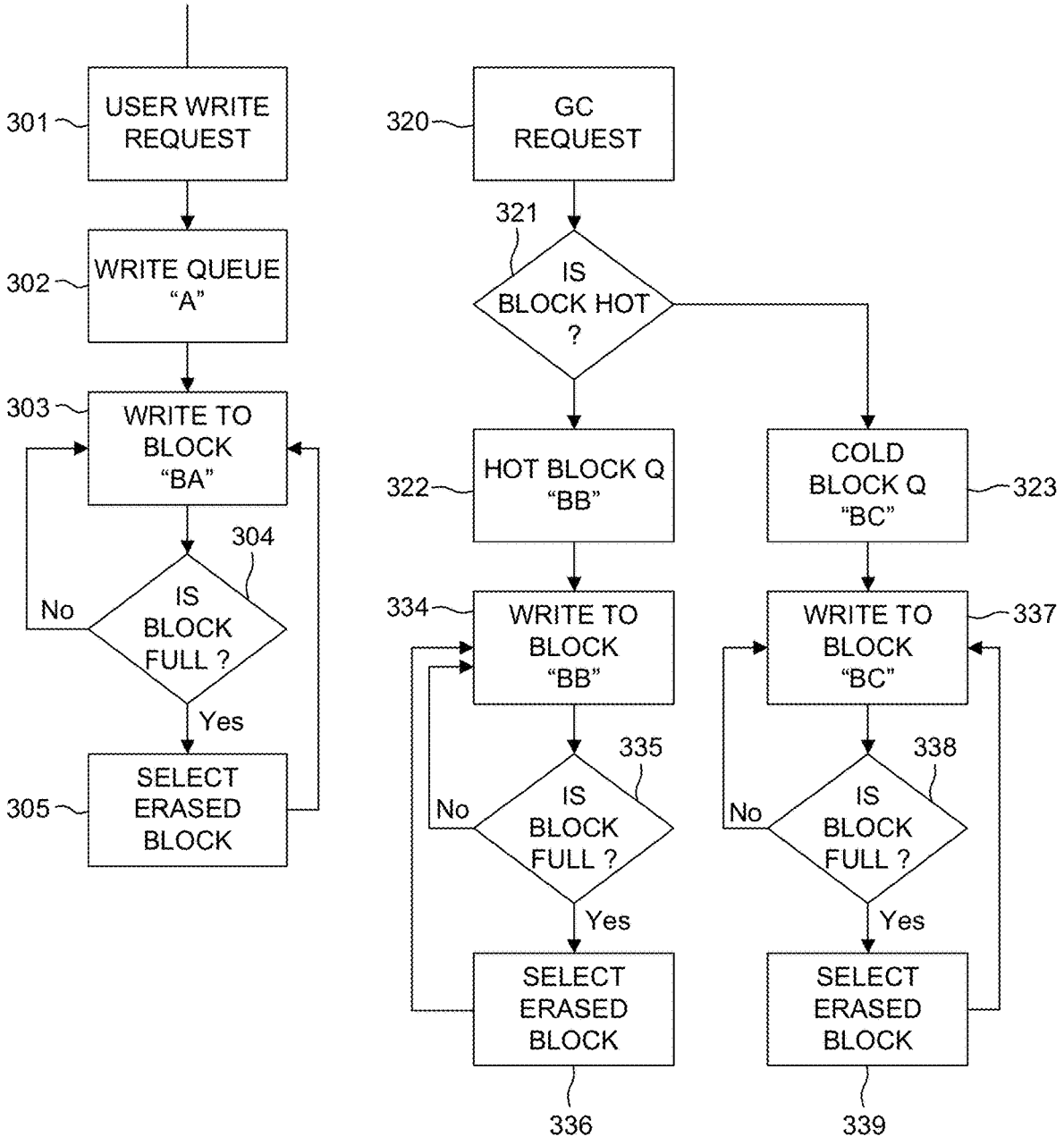
FIG. 3
AMENDED

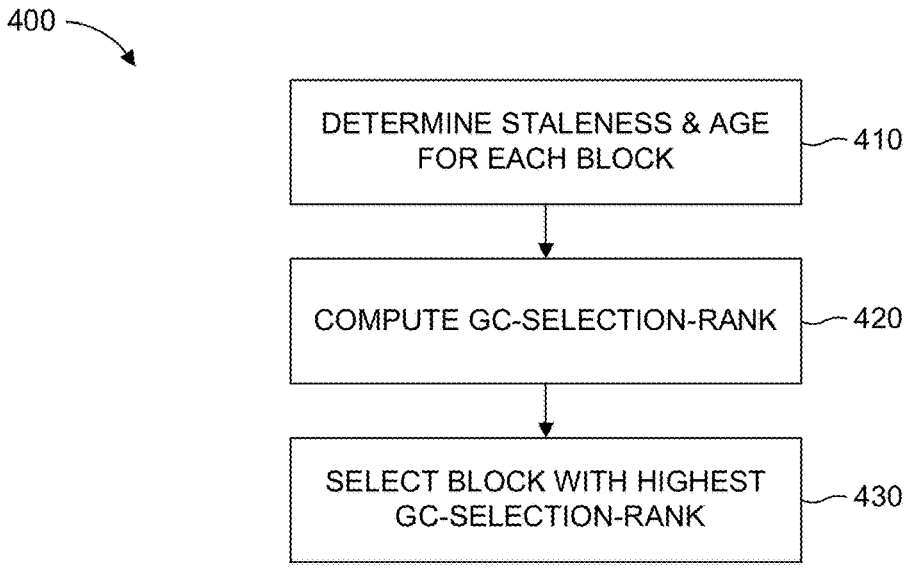
FIG. 4 AMENDED
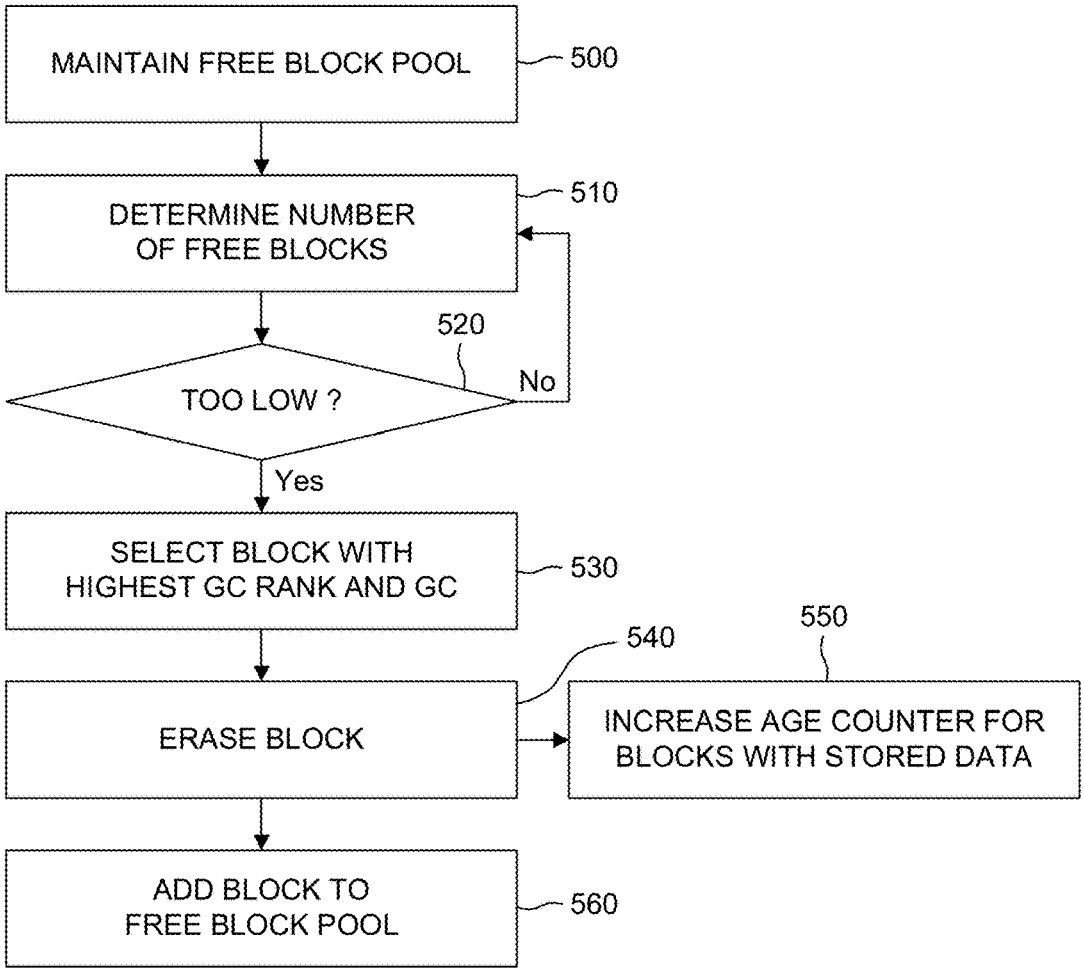
FIG. 5 AMENDED

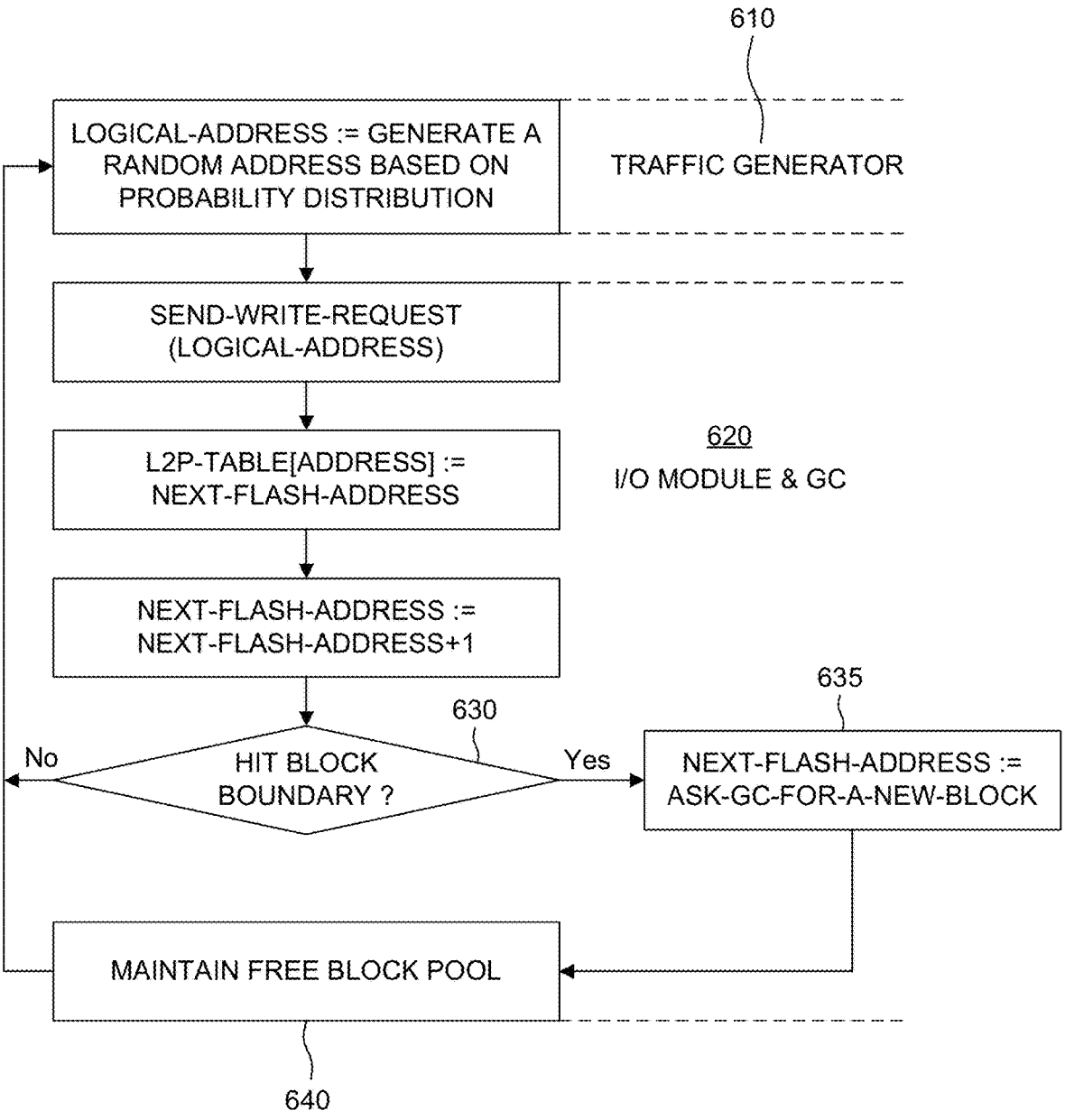
FIG. 6
AMENDED

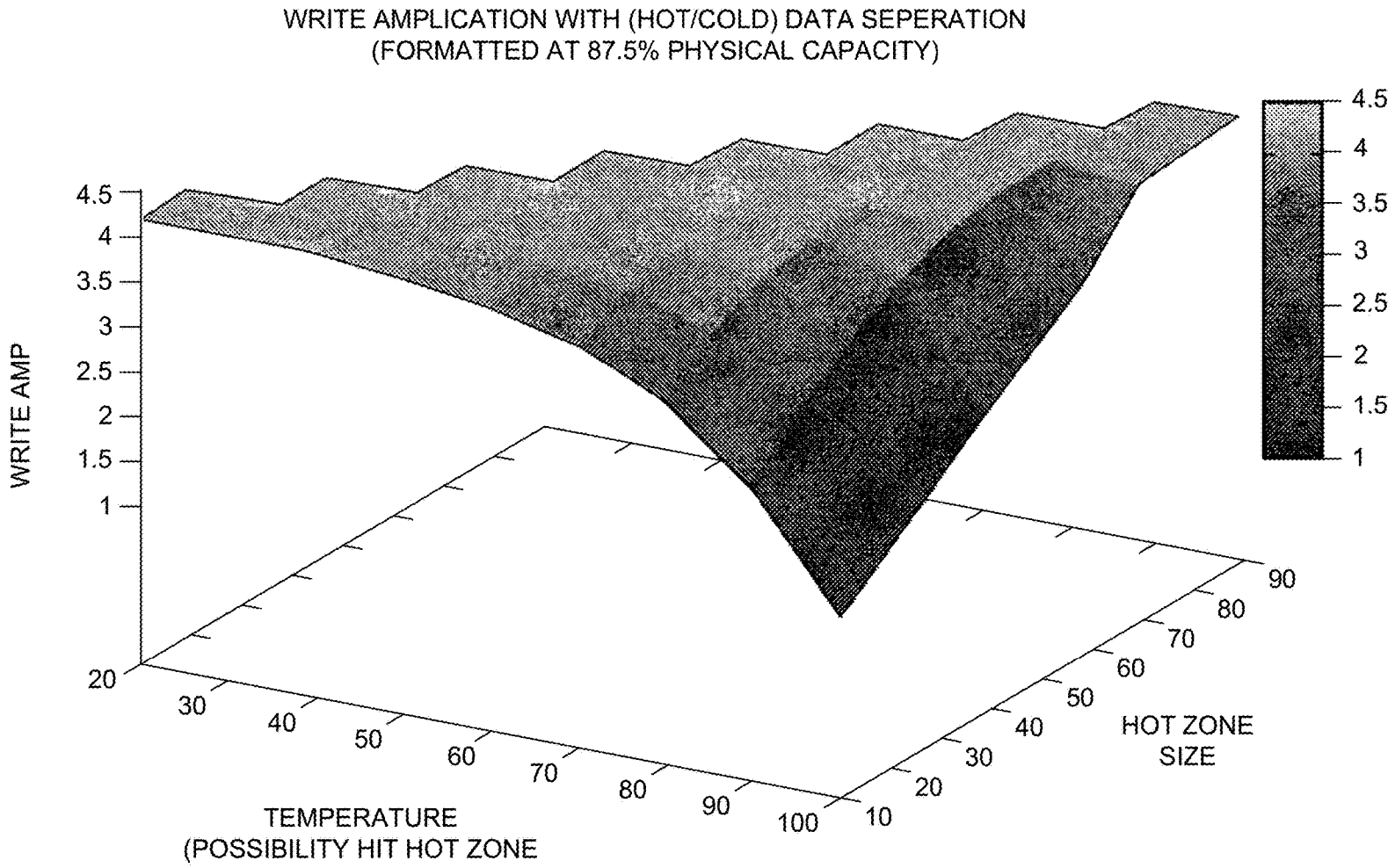
FIG. 7
AMENDED

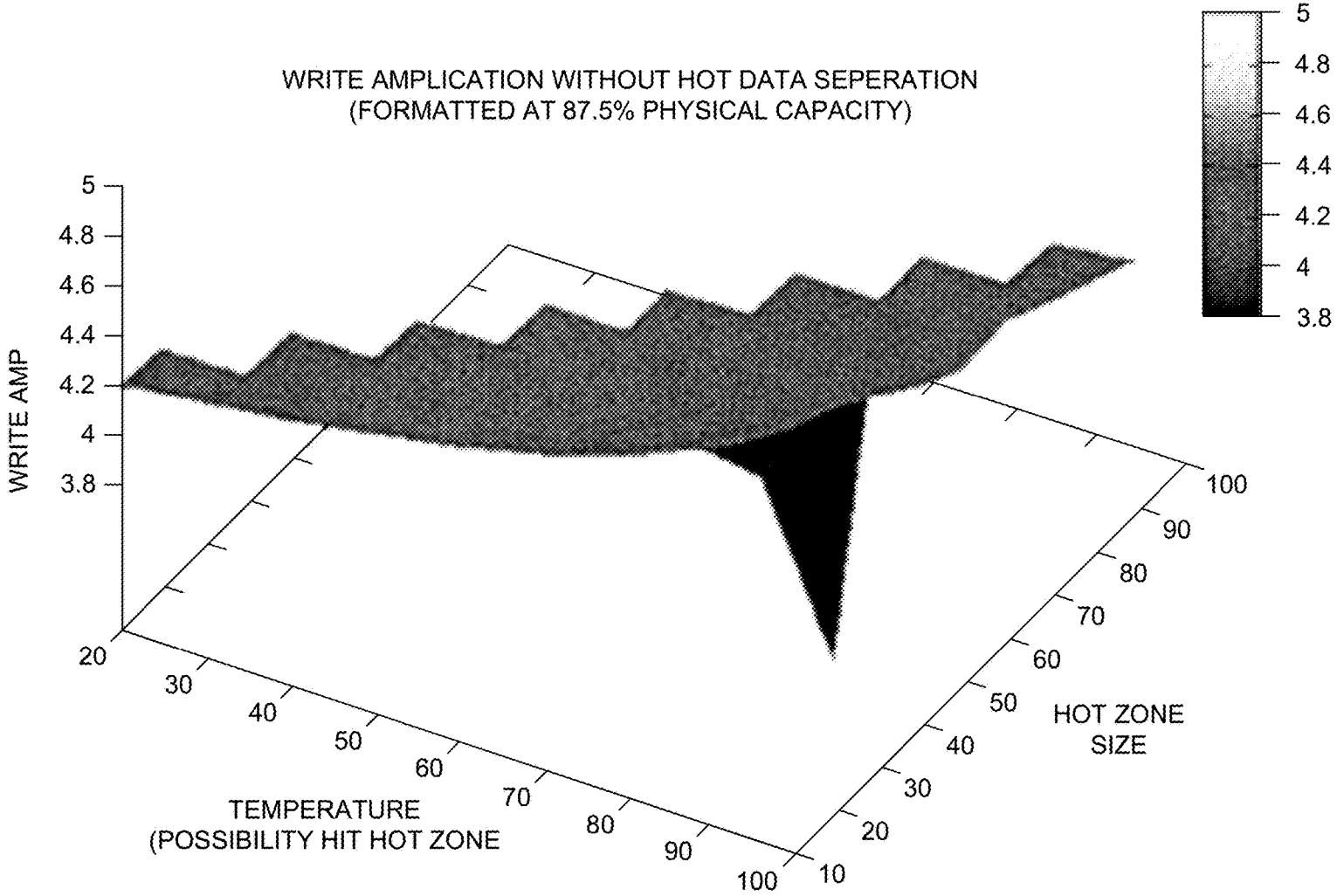
FIG. 8
AMENDED

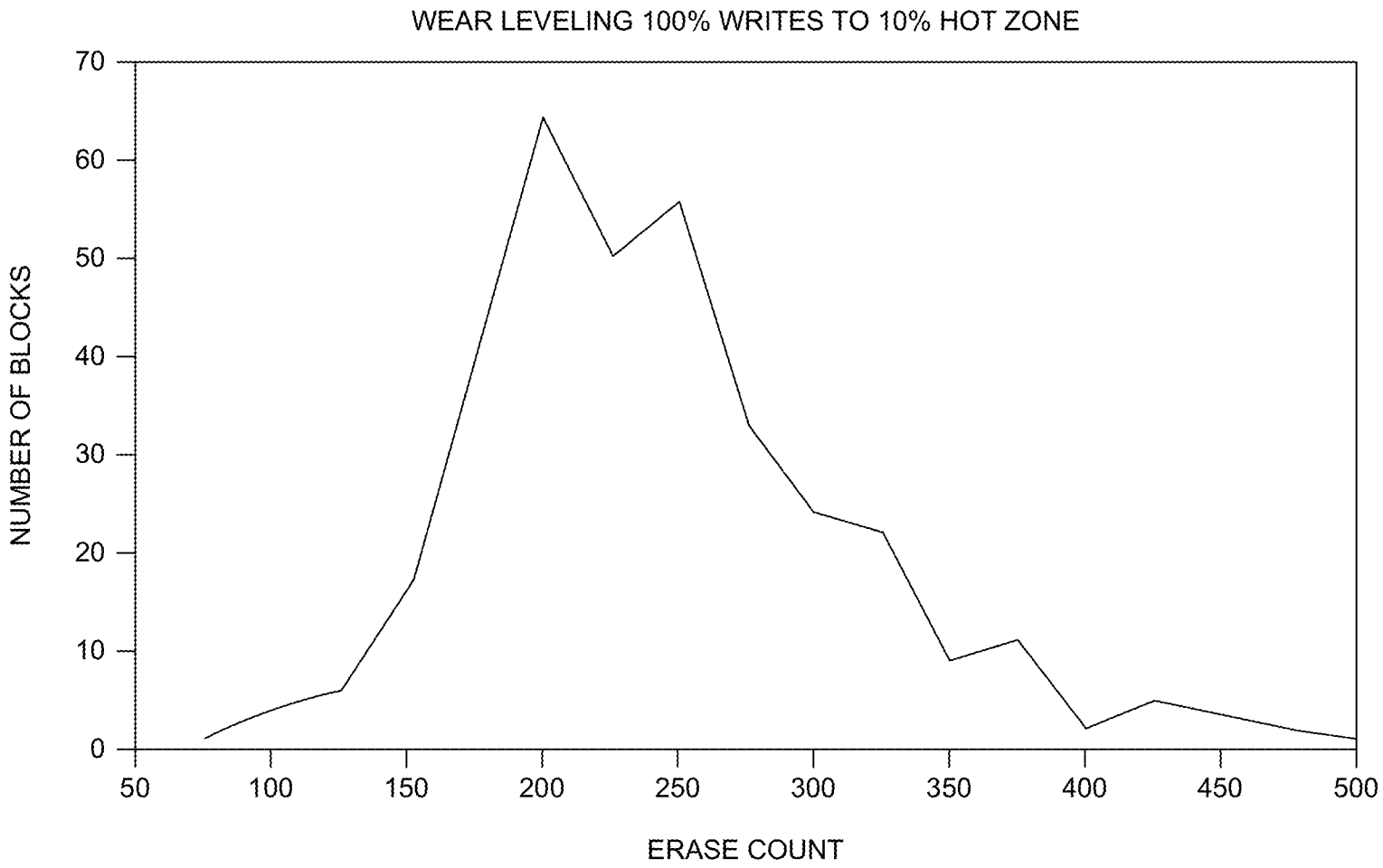
FIG. 9
AMENDED

ADAPTIVE GARBAGE COLLECTION INCLUDING FLASH MEMORY USING AGE AND STALENESS PARAMETERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. provisional application No. 62/093,169, filed on Dec. 17, 2014, which is incorporated herein by reference.

TECHNICAL FIELD

The subject matter of the present application may be related to data storage system.

BACKGROUND

Flash memory arrays are replacing disk storage devices in many applications due to the more rapid response time to client requests for reading and writing data as well as a capability to perform a much higher number of input/output (I/O) operations per second. However, at present, the hardware cost of the flash memory is greater than that of disk and the flash memory is perceived to have a wear out problem, at least if not properly managed.

Large memory systems may service a plurality of individual using applications, and such applications may be independent of each other, as in virtualized systems. In another aspect, a plurality of applications may access and operate on a common memory area, such as where data has been de-duplicated, and is accessed by a plurality of users.

The terms "garbage collection" and "wear leveling" are used to generically describe housekeeping operations that are performed in flash memory systems. Garbage collection may relate to the processes of reclaiming "dead" memory locations created by the writing or re-writing of data to the flash memory. The old data location, representing a value of stored data that has been changed and stored in a new location, or relocated for other reasons, is out-of-date and represents wasted space which needs to be reclaimed so that an appropriate amount of free memory is maintained to permit continued write operations. Write operations continue to occur whenever the data in the memory is being modified by the user, or where additional data is being stored.

To prevent the memory from being filled (that is, to be in a state where there are no free pages) as a consequence of lost space associated with writing or modifying the data contents of the pages of SLC, MLC or TLC NAND flash in a block are written sequentially, from the lowest page address to highest page address. A memory address of a page may be described by the block number on a chip, sequential page number in the block, the sector number in the block, and may include the location of a byte within a sector, if needed.

SLC, MLC and TLC are the current versions of NAND flash memory in production and refer to the number of bits of data that can be stored in each cell of the physical memory (one, two or three). Future developments may result in a higher number of bits per cell, and have already resulted in products where a number of layers of memory are combined in a single chip. The exact configuration of the memory chip is not relevant to the disclosure herein so long as the rules for writing reading and erasing data are similar to the current technology.

A flash memory system 10, shown in a simplified block diagram in FIG. 1 may comprise an interface to the user system 5 and a processor 15 communicating with a flash memory 20 comprising circuits having blocks of memory, each block comprising a plurality of pages. A random access memory 25, which may be volatile memory, may be used as a working memory or buffer. Where NAND flash circuits are used, a person of skill in the art would understand that the pages of a block would need to be erased prior to writing any page of the block a second time. If a page were to be skipped, it cannot be written to until the block is erased. Erase operations can be performed only on an integral block of pages corresponding to the device physical architecture. This property creates the need for "garbage collection" where valid data in the block is relocated so that a block can be erased to reclaim the space that is no longer valid. In simple flash memory systems, each time a page is written the entire block is erased prior to writing the new data. This is inefficient and causes excessive wear as the lifetime of a flash memory chip is characterized by a maximum number of erase cycles.

Writing of data to a block is in response to a write request and therefore may not be temporally continuous. Also, multiple blocks may be available for writing at any epoch, the selection process for blocks being a matter of system design. See, for example, U.S. application Ser. No. 12/796,836, filed on Jun. 9, 2010, which is commonly owned and is incorporated herein by reference.

In an example, a strategy for garbage collection that is used in modern flash memory storage systems, including SSDs (solid state disks), use an abstraction layer often called a FTL (Flash Translation Layer) that relates the user logical address, or LBA (Logical Block Address) to the physical location in the flash memory where the data is actually stored, the physical block address (PBA). The relationship is often said to be embodied in a L2P table (logical-address to-physical-address). A LBA may refer to data at a page size level, corresponding to a PBA having the same capacity in the physical memory and where a block of physical addresses comprises a plurality of PBAs. A person of skill in the art will recognize when a page of data is being referred to rather than a block of pages of data.

The use of these terms respects previous usage while accommodating physical and functional aspects of the NAND flash memory, or memories having comparable function. The use of the terms sector, page, and block n reflects the current commonly accepted terminology for flash memory circuits, and resulted from the adoption of several terms from rotating disk memory technology. The terms page and sector may be replaced by other terminology that is used when referring to data and the location thereof. This should be clear from the context. A person of skill in the art will understand when other equivalent terms are used.

Thus, the granularity of the L2P table may be on a physical page level, such as 4 KB, or a greater or lesser size, depending on the specific system design. Data placement may be managed through the L2P table and with other tables, or lists, of metadata. Herein we will mention some specific metadata, but this is not meant to be a limitation on the amount or type of metadata associated with the stored data. The use of a L2P table permits each page of data to be placed in a physical storage location based on policy, which may involve, for example, out-of-place writes so that the writing of a single page does not necessitate the erasure of an entire block.

In another aspect, the amount of physical memory usually exceeds the amount of memory made available to the user. One may say that the logical address space is less than the physical address space and such abstraction layers as the FTL manage the relationship between logical and physical addresses. The excess of physical memory space with respect to logical address space is termed "overprovisioning". The overprovisioned space is used, amongst other things to provide for storage of system metadata or spare blocks in the event of a failure of a block, so that the entire chip does not fail in response to a failure of a page or a block to be usable. Herein, we will be using a portion of the overprovisioned physical space to facilitate garbage collection (GC) and wear leveling (WL). As the memory system operates and the GC and WL functions are performed, the overprovisioned blocks of memory may be routinely selected and used to store data, while erased block are returned to the pool of overprovisioned blocks. The functions of GC and WL may be performed separately or as part of a same process.

In an example, a pool of "free" blocks (comprised of a plurality of pages) may be maintained by the GC (garbage collection) algorithm comprising a number of never used blocks or blocks that have already been reclaimed by the GC algorithm and have been subject to the block erase process. A free block is one to which data can be written so as to sequentially fill the pages of the block, in whole or in part. If the process is interrupted, the resumption of the writing of data would begin with the next highest free page of the block. The pool of free blocks may include physical memory that was originally part of the memory reserved for overprovisioning where other free blocks are now allocated to overprovisioning. This would be considered an aspect of wear leveling where free blocks are selected such that a cumulative erasure count of each block in the entire flash memory is approximately equal. Alternatively the wear leveling may pertain to a specific selected portion of the flash memory.

In contrast to the simple garbage collection approach which rewrites each block where a page of memory is being modified, including erasing the block, a more efficient method known as "out-of-place" writes is used. In this approach, each page to be written is sequentially written to the pages of a block in ascending order, with the FTL maintaining the correspondence between logical and physical addresses. The block had been unused of previously erased so that all of the pages of the block are initially available to be written. The writing process continues until the block is full, and a new block is selected to continue to write data. Where the data to be written is a modification of previously stored data at a specific LBA, the PBA at which the "overwritten" data is stored is marked as being stale (dead, invalid) and the new or modified data written to a previously erased page as described above. Ultimately the stale PBAs need to be reclaimed for future use.

The process of garbage collection (reclamation of space) for a system employing out-of-place writes may include: a) selecting a free block if there is not already a block being written to; b) moving valid data from a page of the block selected to be garbage collected to the next sequential page in the selected free block; c) designating the page where the data previously resided as being invalid; d) updating the L2P table to point to the physical page to which the valid data has been moved; e) continuing to move the valid data of the block being GC to new physical storage locations until all of the pages of the block being garbage collected are invalid; and, f) marking the block as being available for an erase operation.

Selection of the block to be garbage collected may be determined by the particular GC algorithm or policy. In an example, a "greedy" GC policy is one where, when the need for garbage collection is determined, the block with the largest number of invalid pages of the blocks that are included in the pool of occupied blocks available for garbage collection is selected. The need may arise when the number of free blocks in a free block pool drops to a threshold. As the system timing and resources permit, GC is performed and blocks that have been GC are erased and either returned to the free block pool or considered part of the overprovisioning.

In another aspect, FIFO policy may be used, where the block containing the oldest data may be GC. In this case, the block may contain an unknown number of invalid pages and the block may have a large number of invalid pages or a small number of invalid pages. In the former case, the number of write operations to perform the recovery of a small number of pages of memory is inefficient.

The data retention time of a flash memory cell is finite and, depending on the usage characteristics, the number of erase cycles and the operating temperature, the data in a block would need to be verified or refreshed periodically so as to avoid encountering high read error rates or eventual data loss.

SUMMARY

A system and method for storing data in flash memory is disclosed, the system including, a flash memory comprising a plurality of blocks of memory, each block having a plurality of pages; and, a processor, including a non-volatile memory, configured to operate as a Flash Translation Layer (FTL) to map user logical addresses to physical data page locations in the blocks of memory and to maintain a free block pool by garbage collection. Each block being garbage collected is designated as being hot data block or cold data block according to a first heuristic parameter. Valid data from hot blocks is merged into a first previously erased block, valid data from cold blocks is merged into a second previously erased block and new or modified data is saved into a third previously erased block.

A previously written with data is selected for garbage collection using a heuristic whenever a number of erased blocks in an erased block pool is reduced to a threshold value, based on a second heuristic.

A method of managing a flash memory, includes using a processor to perform the steps of: allocating a first number of blocks of the flash memory to store user data and a second number blocks of the flash memory as an erased block pool, each block of flash memory comprised of a plurality of pages for storing data; receiving user data and storing the data in blocks of the flash memory. For each of the blocks in which valid data is stored: maintaining a garbage collection parameter comprising at least an age parameter and a staleness parameter, where the age parameter is representative of a number of times any block of the usable memory has been erased since a last time the block has been erased, and a staleness parameter may represent a number of stale (invalid) pages of the block.

When an erased block is needed to replenish the erased block pool, a block is selected from the blocks storing data having a highest garbage collection parameter value for garbage connection; and determining the hot/cold status of the block being garbage collected using by computing a heuristic value.

The method further comprises maintaining a first write stream, a second write stream and a third write stream, such that data from the each of the first write stream, the second write stream and the third write stream is written to separate blocks of the flash memory by a flash translation layer. User data is inserted in the first write stream, hot data is inserted in the second write stream and cold data is inserted in the third write stream. If no free page location is available for the selected stream of the first write stream, the second write stream or the third write stream a block of memory is selected from the erased block pool and associating the erased block of memory with a one of the streams requiring page locations for writing the data; and, determining if the number of erased blocks in the erased block pool has been reduced to a predetermined number. If the predetermined number is reached, the block of memory is selected from the blocks of memory storing data having a highest the garbage collection parameter for garbage collection and performing garbage collection.

BRIEF DESCRIPTION OF THE DRAWINGS

FIG. 2 is a representation of the storage pages of blocks of a plurality of flash memory chips;

FIG. 3 is a flow diagram for a processes of writing user data to the memory and garbage collecting blocks by separating the blocks being garbage collected into blocks containing hot data or cold data and merging data of the same heat kind into a destination block;

FIG. 4 is a flow diagram for a process for determining which block to garbage collect;

FIG. 5 is a flow diagram for a process of maintaining the free block pool;

FIG. 6 is a flow diagram for a simulation of the characteristics of the stored data for different selectable parameters;

FIG. 7 is the result of the simulation of the process of FIG. 3 where the hot and cold data have been separated after completion of a learning period, showing the reduction in write amplification;

FIG. 8 is the result of a simulation where the data and the garbage collection data were not processed using the method of FIG. 3 and there was no determination of the hot or cold data status of blocks being garbage collected; and FIG. 9 shows the distribution of the number of times a block has been erased in the simulation of FIG. 7.

DETAILED DESCRIPTION

Figure 1:
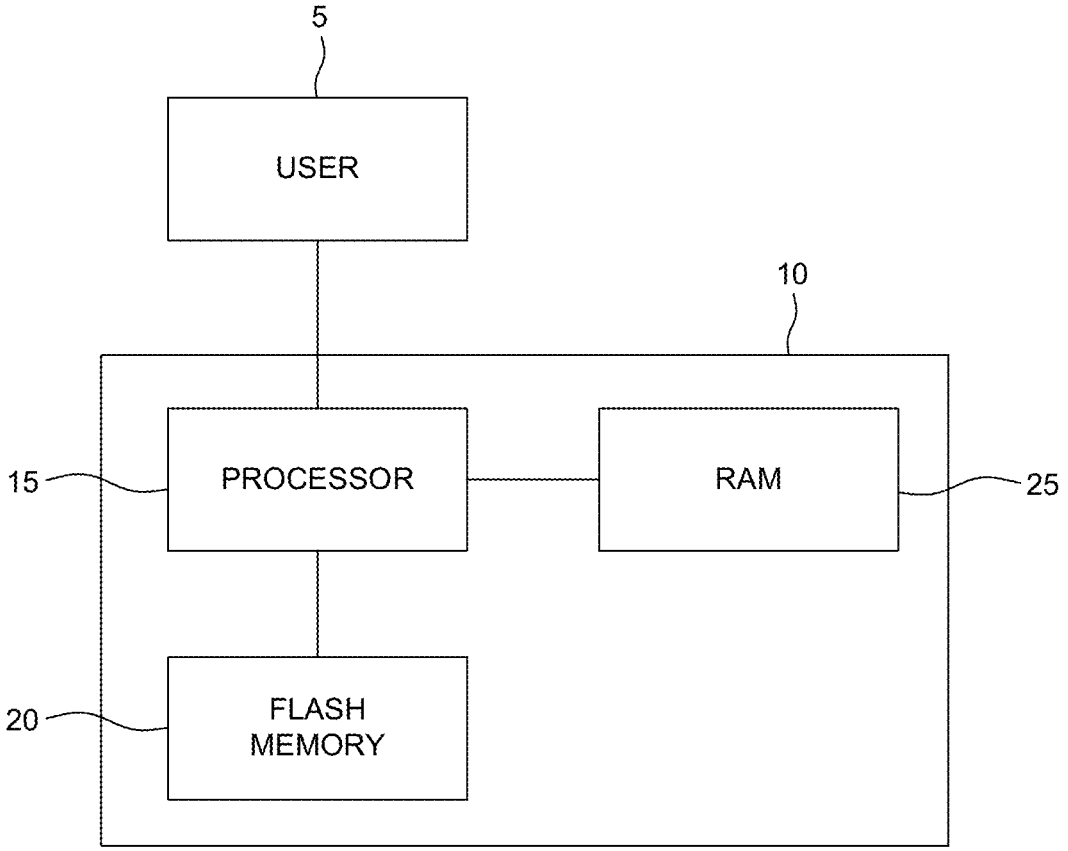
FIG. 1 (Prior Art)
FIG. 1 is a simplified block diagram of a computing system having a flash memory and storing data of a user (Prior Art)

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be interpreted to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and may have the capability of configurable logic.

The methods may be provided, at least in part, as a computer program product that may include a non-volatile (non-transient) machine-readable medium having stored thereon instructions which may be used to program or control a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, DRAM, P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

When referring to the location in a memory system of a block of data one may refer to a Logical Block Address (LBA), which is how the location may be referred by the user, or a Physical Block Address (PBA) which is its actual storage location in the electronic memory system such as the flash memory. Data may be stored in a flash memory circuit in pages, with a plurality of pages forming a block of the physical memory and a plurality of blocks being found in a memory circuit ("a chip"). A non-limiting example of such a memory circuit is Samsung (Seoul, South Korea) part number K9W8G08U1M, having two 512 MByte (MB) dies or chips in the same physical package.

In this context a data page is characterized by a LBA being mapped to a PBA of the block of the physical memory. So the term "block when referring to logical address space in these acronyms should be understood to be of a size of an individual logical page of perhaps 4 KB that is associated with an equivalent sized area of physical memory within the physical block, which is comprised of a plurality of physical pages. Other similar relationships such as "superblocks" comprised of a plurality of LBAs being mapped to a larger PBA, sectors, being mapped to a portion of a page, or the like would also be understood by a person of skill in the art.

As described above, a characteristic of NAND flash memory is that while data may be written to pages of a physical block in sequential order, the physical pages of a block of the memory cannot be overwritten without being first erased, and the erase operation must be performed on integral blocks of physical pages. The page read time, page write time and block erase time are not each of the same time duration, with the write time duration typically being a multiple of the read time duration and the block erase time duration typically being a multiple of the write time duration. Although these times vary with the specific NAND flash type and manufacturer, an example would be read time (100 us), write time (500 us) and block erase time (5 ms). Moreover, a read operation cannot be performed on a chip (or at least a plane thereof) when a write or block erase operation is in progress. Initially, the memory module may have no user data stored therein, when first used or completely erased. As the memory system is used to store, retrieve and modify data, the LBAs are associated with user data to be stored having PBAs allocated by the L2P table of the FTL, When a live data page described by an LBA is read, the operation is performed in place, as the data is not modified, and thus no write operation need be performed. The association of the LBA and PBA does not change. When a data page, described by a LBA is written, a new PBA is selected as a next sequential page of a physical block that has been selected from the pool of memory blocks that are "free", and the L2P table entry for the LBA is updated with the new value of the PBA at which the logical page of data has been stored. This PBA now becomes a "live" page. This operation continues until the pages of the block are all written with data and a new free block is selected to continue the process.

If the data that was written was a modification of data that was previously stored the relationship between the old PBA and the LBA is now out of date, and the old PBA considered as a "dead" page. The page status is changed to be "dead" or "stale". The data of the dead page has not been modified, but the data is now of no current use (so long as the transaction has been properly accounted for in the metadata, for example).

The process described above is appropriate where data has previously been stored in a PBA and is being modified. Where the PBA has never been written to, the process is the same except that no page is marked as invalid. Another process called TRIM may be initiated by the user and result in marking the PBAs corresponding to a plurality of user designated LBAs as being invalid, without moving any data. This occurs in file systems, for example, when a file is being deleted.

In any event, the invalidation of the LBA-PBA link in the L2P creates memory pages that cannot immediately be written to and effectively reduces the storage capacity of the memory.

FIG. 2 is a simplified representation of a physical memory circuit M. Each memory circuit (typically a packaged product) comprises a plurality of semiconductor chips C. Each chip C may have a plurality of memory pages P, each page having a physical block address (PBA) and configured so as to form blocks B. A typical memory page P may store 2048 bytes; there may be 128 memory pages P in a memory block B, and there may be 2048 blocks B on a chip C. This organization may be representative of currently available NAND flash memory circuits. In such a memory architecture, all of the pages in a block need to be erased prior to writing to any page in the block for a second time. The specific values and the organization of the memory are not intended to be limiting, as the components of the memory system are continually being evolved by component manufacturers.

As previously described, when garbage collection is performed, data in PBAs that are valid may be moved to a destination that is not in the current block B, and the associated source PBA marked as "invalid", until there are no more valid pages in the block B and the block may be scheduled for erasure, or is erased. When valid data is moved (when data is being modified rather than the initial time the data is written), the FTL disassociates the value of source PBA from which the data is being moved from the corresponding value of the LBA in the L2P table, and updates the L2P table so that the LBA points to the destination PBA of the valid data, which may be, for example, in another block B. Information needed to identify the LBA may be stored in the auxiliary data of the stored page P, for example. The data itself remains associated with the same LBA, but the PBA where the data is being stored has changed. Physical pages of the block of pages B that have been marked as "invalid" no longer have any association with the current L2P table. The data is still present, inaccessible to the user, in the invalid pages until the block of pages B containing the invalid pages is erased.

In summary, the garbage collection algorithm in a flash memory system reclaims blocks of memory by consolidating the stored valid data so as to create blocks that can be erased to provide "free" blocks to write either new data or to store data relocated from blocks being garbage collected. Before a block can be erased, all of the remaining valid data needs to be moved to another block, such that all of the pages of a block are no longer valid data. The data being moved from the block can be written either to a block that has remaining free pages (erased, but not as yet written pages) or to an erased block, in sequential page order.

Alternatively, the data being relocated for garbage collection can be merged with a stream of new data and written in the same manner. New data, at the level of the system where data is being written to pages of flash memory may be either data that is being written to logical block addresses (LBA) by the user and the page associated with the data is not as yet associated with a specific physical page in a block of the flash memory, or is a modification of data in a page that is associated with a physical page.

In either case, a Flash Translation Layer (FTL), manages the mapping of logical addresses to physical addresses, and would allocate a free physical page of a block to the data to be written based on the protocol for writing data to NAND flash memory; and, where the data is modified data, de-allocate the physical page where the original data for the LBA of the modified data was stored and associate the physical address of the relocated data with the LBA. The physical page that has been de-allocated no longer has valid data as the data in the physical location is no longer related to any LBA through the FTL. When all of the pages of a block to which data has previously been stored are not valid, the block may be erased or marked to be erased in the future.

But, whether a particular page becomes invalid is not ultimately determined by the FTL, but by the specific data write operations commanded by the user, often through several layers of indirection, and including the operation of a garbage collection or wear leveling process. There are overhead operations and data management operations associated with the storage of data, those operations are a result of the pattern of write operations initiated by the user. Virtualized systems accessing a large memory array are particularly difficult to characterize as processing steps such as deduplication, compression, or the like, may effectively randomize the arrival of the data at the level of the system where the write managed are managed by, for example, the FTL.

At any time during the operation of the memory system, blocks of pages may have varying amounts of invalid data, but the rate at which the data is being rendered invalid may not be easily discerned or predicted and the number of write operations actually necessary to provide space for the user-written (including user-modified) data may be significantly greater than the number of user initiated writes due to overhead operations such as GC and WL. Ideally, there should be only one write operation associated with each user-initiated write and one erase operation associated with writing all of the pages of the block. In the limit, the ratio of user write operations to internal write operations, including garbage collection (so called "write amplification factor"), should be close to one.

Where data compression or deduplication is performed prior to storing the data in the physical memory, the number of write operations may be substantially reduced with respect to the number of user-initiated write operations and so it is sometimes asserted that the write amplification (WA) factor can be less than one. For the purposes of this specification, write operations are the operations that actually result in the storage or modification of data that is actually written to physical memory, where each LBA representing stored data maps to a single PBA. At a higher level in the system, multiple user LBAs can map to a single LBA at the FTL level if, for example, data has been subject to a deduplication operation.

So, the status of the memory system at a particular epoch of time may such that, for a memory chip, some blocks have pages having valid data in all pages, some blocks have a mixture of valid data pages and invalid data pages, some blocks have been partially written with valid data pages and have some invalid data pages and some pages that are still available for data to be written, some blocks have entirely invalid data pages, and some blocks have been erased and can be written with data starting with a first page thereof. Pages of an erased (or "free") block may be termed "free" pages. Therefore, some the pages of a free block are neither valid nor invalid. Not all of these conditions may exist in a particular system or at a particular epoch. A block may be subject to GC whenever there are any invalid pages, even if there are still free pages. A block having no invalid pages may also be subject to GC, but one may consider such an action as part of WL or data refreshing.

Blocks having entirely valid data may be either very recently written, where the data has been sequentially written so as to write data into each page to fill the entire block in the recent past. But such data could have also been written a long time ago and be "cold" data. Cold data is data that is valid, but the user does not modify the data frequently, or at all. An example of cold data may be an archived file, an image file or a virtual desktop. But, the file may be read without changing the status of the block. While storing "cold" data off line, such as in a hard disk drive (HDD) may be appealing from the point of view of minimizing the need to GC cold blocks as part of the wear leveling process or using lower cost storage media, this defeats one of the objectives of storage of data in flash memory, which is to provide rapid access to the data. Some of the most frequently accessed data may be cold data.

In an example, apparently cold data may be the unique data that is stored as the result of the deduplication process. Such data may be the result of a determination that two or more separate user logical addresses can be read using the same stored data. Depending on the approach taken to deduplication, the unique data store may relate to a particular user or logical unit number (LUN), a group of virtualized users, or the global user base of a large memory system. When a particular unique data page is referenceable by at least several different logical addresses, the data is likely to be stored for a considerable length of time.

In an aspect, if the number of references to a particular unique data page is taken as a rough measure of the popularity of the stored data, the rate of reading of the data in that page is high while the rate of modification is very low. Certainly one would wish to store such data in a rapidly accessible place such as in the flash memory or a DRAM cached with flash backup and not on a HDD or tape system. For very active data many systems provide a volatile cache memory for even faster access to the data than from the flash memory. But the cache is of limited capacity and, when there is a cache miss, one would not wish to experience a high latency. So, when we describe data as being cold, it is the property of the data that relates to the rate of modification of the data rather than the rate of reading the data.

In another aspect, the pattern of user activity in a memory system may have temporal characteristics, such as diurnal, weekly, monthly and yearly, and the initial time of such patterns may be different times of day, days of the week, or the like, depending on the individual user. In consequence, the actual rates of data modification or retrieval may change. In a large memory system, particularly when the system is accessed by virtualized users, patterns of activity may develop that are not easily predictable or discernable. Data that is relatively hot at one time may become cold over a period of time. The opposite effect may be the case, where a data base is being loaded to the memory or a major update is being performed. Many uses of large memory systems are still effectively batch processes as data mining, accounting and other activities may be driven by business needs. So, if the separation of hot and cold data into separate storage areas may be advantageous in reducing the write amplification, then the adaptation of the storage of the data to changes in the heat of the data may also be advantageous.

The garbage collection process is effectively event driven. That is, if there is no modification of the data, then there is no need for garbage collection. In this context, selection of blocks for wear leveling may initiate a GC operation on the block based on a time-based criterion. But the block selected would be then subject to GC in a similar manner.

The rate of selection of blocks for garbage collection at a particular epoch may be proportional to the rate of data modification: that is, the effective write rate to the flash memory after taking account of any front-end data-reduction processes. Except for ensuring that each block of memory is garbage collected sufficient often in time to avoid data loss due to deterioration of the stored data, the wear leveling of the memory can be accomplished, at least in part, as an element of the garbage collection process, as described herein.

Where write operations of the user may cause the data in a physical address of a block to be changed, the changed data is written to a page in another block having free pages. The result is that some of the pages of the previously entirely valid block are now invalid. Over a period of time more of the pages of the block may become invalid. We characterize the rate at which this invalidation occurs as the "heat" of the block, where we have already described the properties of a "cold" block. A process that rapidly invalidates pages of a block would be called "hot", with "warm" being an intermediate case. This property of the data is easier to describe using qualitative terms as the specific characterization of the rates may be dependent on the system design. However, simulations are provided herein that will assist a person of skill in the art to establish quantitative values for these terms for design purposes. So, cold, warm and hot would be understood as the relative speed of the process.

After some time, a block may exhibit a relatively high number of invalid pages. Since data cannot immediately be written to such invalid pages, the system storage capacity is reduced. Consequently the garbage collection system design would consider the number of free blocks remaining in a free block pool, and garbage collect partially invalid blocks in accordance with a predetermined schema so as to reclaim the invalid physical storage locations.

Once the block of data has no valid data stored in its pages, the block could be erased or at least marked as being available to be erased. This may not occur immediately, depending on the system design. However, when the time to perform the erase operation arises, the block may be erased without a need to move any data. Since wear out is a function of the number of erase operation cycles on a specific block, one of the parameters that is maintained for each block is the number of erase cycles from the beginning of the use of the chip.

Blocks having hot data will have a more rapid increase in invalid pages than pages having cold data; the effect is that hot blocks will become candidates for garbage collection more frequently than cold blocks. In a dynamic system multiple levels of indirection between the user view of the data and the locations at which the data is actually stored makes the predication of the heat of block or its variation with time somewhat impractical. But, if the hot data could be concentrated in one set of blocks and the cold data in another set of blocks, the write amplification would be reduced as, on the average, there would be a smaller number of valid pages that would have to be relocated so as to reclaim a block. If not for the need to perform wear leveling or data refreshing, very cold blocks would not need to be garbage collected at all. Put another way, the average number of write operations necessary to prepare a block for erasure would be minimized.

In a sense, the increasing number of invalid pages in a block is a type of memory fragmentation where memory space is temporarily lost. To the extent that this fragmentation is randomly allocated to the individual blocks, there will be a large number of partially invalid blocks of data. If the data could be arranged by the heat properties, the efficiency of the garbage collection and wear leveling processes could be improved.

Various definitions of heat may be used, and the following simulations are considered to be exemplary and not intended to be limiting. Moreover, the process is described as if all of the operations were being performed on a block or blocks of pages selected from the blocks of a single memory chip. But, the wear leveling process may span multiple chips, a memory module or a memory system.

FIG. 3 is a simplified representation of the pages of a block of the flash memory at a particular epoch. Pages may be valid (have data), partially or wholly stale (invalid or once held valid data) or free (not been written with data since the block was erased and where data can be written.) Should a page be skipped during the writing (and this is generally avoided), the page is effectively invalid as it cannot be written to until the block is erased.

To illustrate the method described below, the pages of a block are designated as free (erased) (F), available to be erased (E), a block having valid data written to it, some of which may have become invalid (B) and three blocks currently being written to: BA, BB and BC corresponding to the processes of the method described below.

In an example of the method 300, a plurality of data streams to be written to the flash memory chip are created with differing traffic patterns or sources of data to be written. For example, a first stream of data (A) may receive data that originates with the user (after any pre-processing such as deduplication, compression, RAID, or the like), a second stream (B) may receive data that originates in the garbage collection of "hot" blocks, and a third stream (C) may receive data that originates in the garbage collection of "cold" blocks. Data from stream A may be written to block BA, data from stream B may be written to block BB and data from stream C may be written to block BC. Data that originates with other housekeeping operations may be routed to a separate data stream or otherwise allocated to the main streams A, B, C described above, or additional streams may be created and similarly managed. A fourth stream D (not shown), may be used to store metadata journals in circular buffer fashion, where garbage collection consists of erasing whole blocks containing metadata without relocating any data when the buffer is overwritten.

For purposes of description, each of the data streams may be accumulated in a RAM buffer and managed individually. Alternatively, data received by the memory controller of the memory chip may be immediately routed in accordance with its stream designation (A, B, C), with only as much buffering as may be needed to accommodate conflicts in allocation of resources such as bus bandwidth, chip access or the like. It should be understood that all of these operations may operate in symbiosis with other processes for reading data, and for managing the operation of the flash memory, such as "erase hiding" as is known from U.S. Pat. No. 8,200,887, issued on Jun. 12, 2102, which is commonly owned and which is incorporated herein by reference.

Each specific block of a memory chip may be characterized as having an "age" which is a measure of the number of blocks in the memory chip that have been erased since the specific block was erased. Thus the age may increase faster or slower depending on the overall usage rate of the memory system for writing data. A staleness value may be established where the higher staleness blocks have more invalid data. The block to be garbage collected may be selected based on a schema or heuristic that may use the age and staleness as parameters. The processing of the data being garbage collected may be determined by the heat of the block.

Data that is being written or modified by the user is allocated to processing stream A so as to be directed to a selected block BA. The difference between a write to an unused logical page or a modification to a stored data page (at the logical level) is that both operations result in writing the data to block BA, but the modification operation also invalidates the link to the previously physical location and marks the previous physical location as being invalid.

When the valid data are read from a block being garbage collected, the data of the valid pages are routed to streams B or C, depending on whether the block being garbage collected has been determined to be hot or cold. Thus, when data is being relocated for garbage collection, the data from more frequently modified (hot) blocks is combined with data from other hot pages when written to a new block BB through stream B, whereas the cold data (low staleness) is combined with other cold pages through stream C and written to a different block BC. So, each of the streams A, B, C is separately written to an erased block selected from an erased block pool in accordance with a schema. The data may be written to the pages of the selected blocks on a continuous basis for each stream individually and the location accounted for by the FTL, or some of the data may be buffered in the RAM.

Blocks written using the data from stream B are likely to contain more frequently modified data than blocks written using the data from stream C. Stream A contains user writes, which comprises new and modified user data. The data from the A stream is considered to be of indeterminate heat as the heat property relates to the relative frequency of change of the value of the data at an LBA subsequent to the time that it is first written in response to the user write operation. In contrast, streams B and C already have such a heat property based on prior actions that resulted in modification of the stored data.

It is the modification of user data that results in pages of a block being rendered invalid as the modified user data for the logical block address (LBA) is written to a free page of the block currently being written (e.g., BA) in sequential physical page order and the previously mapped physical address becomes invalid in the previous storage location As shown in FIG. 3, a write request is received from a user (which may be a higher level data management process) 301, and the data is placed in a queue or stream A 302. Step 302 may be omitted and the data immediately written to a block BA 303. Step 303 is repeated until the block has been completely written with user data 304, and a new erased block is selected from a pool of erased blocks as a new block BA 305, to which the process of writing continues.

When a block is garbage collected 320, each valid page of the block is written to a new PBA. Depending on the determination of whether the block is hot or cold 321, in accordance with a heuristic, which will be later described, the valid data of the entire block being garbage collected is designated as being a hot block 322 or a cold block 323. Each of the hot or cold blocks is associated with a queue or data stream and associated with a block BB or BC, respectively. The process of writing the data to the blocks 334, 335, 336 for the hot data and the cold data 337, 338, 339 is analogous to that for the user written data 301 and this results in data from hot blocks being written to a different new block than data from cold blocks.

A block may be selected for garbage collection based on a heuristic that involves using the age parameter for the block and the staleness of the block The staleness is a count of the number of stale pages in the block, and may be expressed as the number of invalid (stale) pages in the block or the percentage of the block that is stale. Stale pages are pages that previously held valid data, but whose state has been changed to stale (invalid, dead) by the FTL or other operating system action. This change is normally associated with modification of the data stored on the page which causes the data to be written to another physical location in order to modify the data (out-of-place write), or by an operation of a TRIM command or an equivalent thereof. The change may also be associated with data refreshing or recovery operations, for example.

An example of the heuristic garbage collection block selection parameter may be expressed algorithmically for each block B as, for example:

$$\text{gc_selection_rank}=(\text{staleness})\times(\text{age}+K) \quad (1)$$

where staleness may represent the number of the pages in the block that are invalid, the constant K is empirically determined and may be, for example, N/2, where N is the number of blocks in the FLASH memory being managed; a minimum value of the staleness is 1; and, the age is the number of block erasures (of blocks of whatever group of blocks is part of the process) since the block was previously erased.

When a free block pool (e.g., erased blocks) is diminished to a number where existing blocks need to be garbage collected and consolidated so as to create additional free blocks, a next block to be garbage collected may be selected based on the heuristic, an example of which is the gc_selection_rank. The block with the largest value of the heuristic may be chosen. At the time of garbage collection, the heat of the block, for example, may be used to route the data to the appropriate stream for writing to a free block to consolidate the valid data. If hot data (low age, high staleness source block) is being moved to stream B and cold data (high age, low staleness source block) is being moved to stream C, the characteristics of the data in each stream tends to be relatively hot or cold, respectively. The constant K (other than zero) in equation (1) ensures that all blocks having data stored thereon are eventually selected for garbage collection. To the extent that this results in the eventual garbage collection of very cold blocks, the need for a separate WL operation is either obviated or minimized.

Conceptually, a lower value for the constant K prioritizes the separation of the hot and cold data, but the set of data that is thought to be cold may be more stable. A lower value for K prioritizes wear leveling and this may result in misidentification of some hot data as being cold. Overall, a higher value of K may result in a higher value for the write amplification. If the staleness of a block is initialized at 1, for example, the block will experience an increase in gc_selection_rank as pages become invalid due to modification or deletion of the user data at the PBA corresponding a user LBA and in the age as other blocks are erased and the block may be garbage collected when the gc_selection_rank reaches a predetermined value or the free block count drops to a predetermined value. (Data may also be rendered invalid due to operation of system maintenance functions such as wear leveling and refreshing. Where the remainder if a block of data is invalidated by a maintenance function, whether the data is treated as hot or cold may depends on the specific system design.

This process is shown in FIG. 4, where the age and staleness of each of the blocks containing stored data is determined 410, and the heuristic using these parameters is computed 420. When a block is needed to replenish the erased block pool, the block having the highest gc_selection_rank is selected for garbage collection 430.

In an example, FIG. 5 a method 500 of maintaining the free block pool includes determining the number of blocks in the free block pool 510 and comparing that number with a threshold value 520 to determine if the number of blocks remaining in the free block pool has reached a lower limit. When this occurs, a block is selected in accordance with the method of 400 and garbage collected 530. When the GC process has completed a block marked as being available for erase is erased 540 and the age counter of the remaining blocks is increased 550. The erased block is added to the free block pool 560.

An example of a method of determining the heat of the data stored in a block utilizes a counter for a group of blocks (which may be the blocks of a chip) and incrementing the counter each time that a block has been completely written. The value of the counter at that time is associated with the chip (device age), and the age (B) of the block at any future time is the difference between the stored value for the chip and the current device age. So the age of any block that contains valid data (and therefore has not been garbage collected) increases by one each time another block is GCed. When a block has been selected for garbage collection using, for example, the gc_selection_rank, that block is deleted from the list of blocks used for storing data, erased and placed in the a free block pool. It does not again have an associated block age until such time as the block has been selected for writing of data and has been written.

Thus the group of blocks storing data will have various block ages and may be rank ordered, with the oldest block containing any valid data having the highest rank. We may use an aging factor, where $$\text{aging_factor}(B)=(\text{age}(B)/\text{rank}(B))/D \quad (2)$$

where the constant D in equation (2) and the constant K in equation (1) affect the training time.

The training time is the time to reach a relative steady state value for the WA factor for a particular statistical behavior of the data being written. Arbitrarily, the constant D is selected such that an aging_factor(B) of unity is the division between hot and cold blocks.

In order to illustrate the performance of the system and method, an example simulation of garbage collection operation has been performed. To avoid influencing the result by the interaction of the garbage collection algorithm with other aspects of the complete system, a traffic simulator 610 as shown in FIG. 6 provided an input data stream to drive the data storage and indirectly drive the garbage collection algorithms. This represents the situation where the upper-level software processes have performed, for example, deduplication and compression or virtualization and the process described here accepts the data from the output of the upper-level processes without metadata characterizing the type of data being stored. Where such metadata is available, additional sorting of the input data by heat may be possible.

The simulator runs on a personal computer (PC) in a Linux environment. The I/O module simulates a storage write operation managed by the FTL, configured so as to confirm to the basic requirements of NAND flash memory. That is, the pages of a block are written in sequential order 620 and mapped to the incoming data using the FTL and L2P table. When the block has been filled 630, the next write request initiates a selection of a free block from the free block pool 635, and the free block pool is maintained 640, a step which may involve initiating the garbage collection of one or more blocks.

As the garbage collection process simulation uses the metadata representing each page and the block and of the block as the basis for performing the process rather than the actually stored data, the simulator did not store any data per se. Rather, only a list of logical page addresses (Logical Block Addresses (LBA)) was used to represent the data so as to conserve memory space and increase the simulation speed. Here the logical page size is 512 bytes, the size of a physical page in the flash memory is 4 KB, comprising 8 sectors and a block is 256 pages.

Table 1 is an example of a L2P for a logical address range of 1 to 1,000,000 that has been mapped to physical addresses, where the relationship between the logical and physical addresses may have been assigned when the data was last written to the flash memory.

TABLE 1

Example L2P Table

| Logical (user sector) address | Flash physical address |
|---|---|
| 0 | Block 0: Page 1: Sector 1 |
| 1 | Block 20: Page 0: Sector 3 |
| 2 | Block 15: Page 255: Sector 0 |
| . . . | . . . |
| 1,000,000 | Block 30: Page 17: Sector 6 |

The traffic generator 610 simulates user writes from a client, which represents a higher-level software process, external user, or the like. This can represent the data stream A in FIG. 3 associated with user data writes. An address probability distribution can be selected and the traffic generator generates logical address write requests in accordance with the logical address probability distribution and an address range for hot and cold data user data respectively, and a sequence of such requests is operated on by the I/O module so as to manage Table 1.

Two cases were studied: (1) the multiple stream schema of FIG. 3; and (2), a case where a single stream of data to be written is used. The single stream case (2) would merge all of the data of case (1) so that there was no differentiation as to heat or the source of the data to be written. We will compare the write-amplification performance of the two schemas. For case (1), the user data is hot and cold data as identified a priori in accordance with the statistics of the traffic generator and is mapped to physical addresses by the FTL operating on stream A, as previously described, and results in patterns of hot and cold data developing on the blocks of the memory system. The relationship of the characteristics of the user data pattern and the resultant storage pattern is not straightforward and evolves with time. That is, the system eventually learns where the garbage-collected data ought to be routed. Eventually the data of stream A, as stored in a block, is garbage collected and is allocated to stream B or C, as appropriate.

An example of a probability distribution for the write data characteristics is 2 independent random variables, each having a uniform distribution. This is a Bates distribution with n=2, so that a pattern of "hot" writes and a pattern of "cold" writes is generated. One index simulates hot write, the other cold write. In this way two separate processes occupying the full time line and full extent of the memory can be simulated. Each process has a probability of occurrence and an address range in which it operates. This simulates a variety of unrelated user processes writing or modifying data as may be experienced with a memory system.

The two input variables are the hot data probability and the hot data address range; from this the cold data probability and the cold data address range are deduced as the remainder of the probability distribution and storage space. The address ranges for the hot data and for the cold data may be fragmented into a plurality of address ranges that may not be contiguous, although the simulation uses a contiguous range. This might arise when blocks of LBAs are allocated by a system management functions to, for example, logical unit numbers (LUN) of the user or to virtual machines (VM). A large number of generated LBAs are processed by the I/O simulation module, as if the traffic generation process was modifying the data of the LBAs and relocating the data to a new physical address in accordance with the FTL algorithm, the number of pages in a block, the number of blocks in a free (erased) block pool and the number of blocks in the memory device that is being simulated.

Apart from consuming memory bandwidth and processor resources, the write operations directly and indirectly cause wear on the flash memory storage cells and increase the number of erase operations that are needed to replenish the pool of erased blocks. In a sense, any operation of the FTL that relocates the data contents of a page of the memory and that is not a direct result of storing data provided in the user request is undesirable. A low write-amplification factor is a desirable attribute of a GC method.

The simulation used a memory size of 8192 blocks having 2048 sectors (512 bytes)/block (256 pages/block), with a page size of 8 sectors. The block size was 1 MB and the device size was 8 GB; and, a single user having the stated statistical properties as the source of the LBA data stream. A pool of free blocks is maintained so as to provide an erased block whenever needed to write data; only 87.5 percent of the blocks were made available for the user with the remaining percentage of the blocks allocated to the free block pool. Note that some of all of the free block pool may be part of the overprovisioning of the memory capacity. All of the overprovisioning that is not being used so as to provide for block or page failures and other data not accessible to the user may be considered to be part of the free block pool. Hidden data may also be subject to garbage collection by the user data process or by a similar process acting only of the metadata.

On average, for each block removed from the free block pool to be written with data, a the equivalent space of one or more blocks currently containing valid user data needs to be garbage collected and erased. As this is a simulation directed towards determining the write amplification performance, a block is garbage collected promptly when it meets the GC schema criteria. All of blocks available to the user are presumed to be filled with valid data at the commencement of the simulation (that is, the array is full of data) and the pages of the blocks are being invalidated by the writing of data which modifies the stored data.

The simulation randomly writes hot or cold data to the I/O interface based on the above mentioned process variables for processing by the FTL such that sufficient data is written to write all of the user available memory 16 times using 8 KB pages. So, for a memory size of 1 TB, there are nominally $3\times10^{10}$ sectors written for each simulated case. The GC algorithm was enabled in the simulation when the number of free blocks was reduced to four. In a practical system this number may be greater so as to provide for additional time-line margin. Here, the actual timing was not studied, just the write amplification.

Simulations were performed over a range of hot zone sizes (as a percentage of the memory system) and probability that the write operation is in the hot zone. FIG. 7 is an example of output from the simulator for case (1) where three streams of data to be written are separately routed for writing to individual blocks selected from a pool of previously erased blocks. The constant K was set at N/2 where N is the number of blocks in the flash memory being simulated.

In comparison, FIG. 8 shows the results where a straightforward GC approach of case (2) is used where the sequence of pages to be written are based on the user LBAs generated for the same hot/cold pattern by the LBA pattern generator and the physical pages that are being relocated due to garbage collection are not segregated in any manner. This would be typical of garbage collection systems where the most-stale block was selected for garbage collection regardless of the heat.

The write amplification for case (1) is noticeably smaller than that of case (2) for a wide range of simulation parameters. As one expects hot areas in user space, where the user space may be, for example, virtualized, and there may be a large number of independent users, the algorithm adapts to such variations in spatial and temporal activity without keeping track of the details of the memory usage.

The hot/cold garbage three-stream collection algorithm described herein also has an attribute of leveling the wear of the individual blocks by redistributing the sequence of reutilization of erased blocks. The blocks may be allocated to individual pools or maintained as a common pool. FIG. 9 shows the distribution of the number of erases for each block in case (1), where the GC algorithms were executed so that about $100\times10^{12}$ write operations were performed on a memory size of 1 TB.

Even when all of the write operations are performed to a small hot zone of the logical block addresses of the memory space, the wear on the blocks is relatively evenly distributed over the extent of the blocks. Some further adjustment of the algorithm to limit the spread of the distribution about the center may be useful, but the routine operation of the algorithm provides substantial intrinsic wear leveling. In an example, of a further method of wear leveling arising from this approach, the pool of free blocks may be periodically sorted so as to preferentially de-queue the least erased block when a new free block is needed.

In another alternative, the garbage collected blocks may be added to a pool that is erased shortly before an erased block is needed, and the block to be erased may be selected based on selecting the least often erased block.

To summarize, a method of garbage collection in a flash memory system comprised of a plurality of blocks, further comprised of a plurality of pages in each block includes:

a. maintaining a pool of erased (free) blocks;

b. maintaining a plurality of write data queues;

c. maintaining a relationship between a user logical block address and the physical memory location using a flash translation layer (FTL) and writing the data from the write data queues to the physical memory location;

d. updating a gc_selection_rank for each block containing valid data;

e. selecting a block to be garbage collected based on the gc_selection_rank;

f. garbage collecting the selected block;

g. determining whether the selected block contains hot data or cold data;

h. inserting data from a hot block in a hot block queue, data from a cold block in a cold block queue and user data in a user data queue;

i. erasing the selected block and adding the erased garbage collected block to the erased block pool; and j. writing data from each of the hot, the cold and the user queues to separate blocks selected from the pool of erased blocks.

In an aspect, the gc_selection_rank is determined by a heuristic including the age of the block and the staleness of the block. The staleness of the block may be determined by an index that is incremented each time the state of a page of the block is changed from valid to invalid. The age of the block may be determined by an index that is incremented each time any block of the memory is erased.

The heuristic may be determined such that a block reaches the gc_selection_rank needed to be eligible for garbage collection when the age exceeds a predetermined value, regardless of the stalenesss index. Similarly, the heuristic may be determined such that a block reaches the gc_selection_rank needed to be eligible for garbage collection when the staleness index exceeds a predetermined value, regardless of the age index.

Whether the block is treated as hot or cold is determined at the time that the block is selected for garbage collection using another heuristic, such as equation (2). A block having an aging_factor less than a predetermined value is considered to be hot and a block having a staleness index greater than or equal to the predetermined value is considered to be cold. Other heuristic measures may be developed and used for both the selection of the block to be garbage collected and the heat of the selected block.

Data from the hot block queue, the cold block queue and the user queue are separately written to free blocks selected from the pool of erased blocks. The data is written in accordance with the protocol for writing FLASH memory such that the pages are written in sequential order until the maximum number of allocated pages in the block have been written.

In an aspect, an identifying link to each of erased blocks in the pool may be maintained in a FIFO queue or the blocks may be ordered such that the least frequently erased block is selected when a block is de-queued from the free block pool. In another aspect, separate pools of erased may be maintained to service the hot, cold and user write queues.

In order to gain insight into the selection of the parameters D and K in the heuristics used above, Table 2 contains the results of simulations where the parameters are varied and the number of writes to reach a steady-state write amplification (WA) value are parametric in the hot/cold data mix.

TABLE 2

Example Performance Simulations

| D (b) | K/N (a) | Steady state WA (c) | Training cycles (million user writes) (d) | Hot/:Cold ratio (e) |
|---|---|---|---|---|
| 0.5 | 2 | 1.08 | 311 | 10/90 |
| 1 | 2 | 1.08 | 311 | 10/90 |
| 2 | 2 | 1.08 | 311 | 10/90 |
| 4 | 2 | 1.08 | 311 | 10/90 |
| inf | >>N | 1.38 | | 10/90 |
| 1 | 0.2 | 1.17 | 474 | 10/90 |
| 1 | 0.8 | 1.08 | 311 | 10/90 |
| 1 | 1.6 | 1.08 | 255 | 10/90* |
| 1 | 6.4 | 1.09 | 772 | 10/90 |
| inf | >>N | 1.38 | | 10/90 |
| 0.5 | 2 | 1.32 | 78 | 20/80 |
| 1 | 2 | 1.32 | 78 | 20/80 |
| 2 | 2 | 1.33 | 184 | 20/80 |
| 4 | 2 | 1.34 | 553 | 20/80 |
| inf | >>N | 4.64 | | 20/80 |
| 1 | 0.2 | 1.32 | 163 | 20/80 |
| 1 | 0.8 | 1.31 | 227 | 20/80 |
| 1 | 1.6 | 1.31 | 71 | 20/80* |
| 1 | 6.4 | 1.33 | 205 | 20/80 |
| inf | >>N | 4.64 | | 20/80 |
| 0.5 | 2 | 2.59 | 708 | 50/50 |
| 1 | 2 | 2.12 | 240 | 50/50* |
| 2 | 2 | 2.18 | 530 | 50/50 |
| 4 | 2 | 2.24 | 630 | 50/50 |
| inf | >>N | 4.64 | | 50/50 |
| 1 | 0.2 | 2.13 | 184 | 50/50 |
| 1 | 0.8 | 2.13 | 226 | 50/50 |
| 1 | 1.6 | 2.12 | 255 | 50/50 |
| 1 | 6.4 | 2.13 | 468 | 50/50 |
| inf | >>N | 3.64 | | 50/50 |
| 0.5 | 2 | 3.41 | 128 | 80/20 |
| 1 | 2 | 2.94 | 191 | 80/20* |
| 2 | 2 | 3.06 | 900 | 80/20 |
| 4 | 2 | 3.23 | 880 | 80/20 |
| inf | >>N | 3.52 | | 80/20 |
| 1 | 0.2 | 2.93 | 190 | 80/20 |
| 1 | 0.8 | 2.94 | 198 | 80/20 |
| 1 | 1.6 | 2.94 | 226 | 80/20 |
| 1 | 6.4 | 2.94 | 283 | 80/20 |
| inf | >>N | 3.52 | | 80/20 |

Notes:

(a). GC_SELECTION_RANK(B) = (staleness(B)) × (age(B) + K).

(b). AGING_FACTOR(B) = (age(B)/rank(B))/D.

(c). Steady state WA = write amplification when the system reaches steady state.

(d). System parameters: 16,000,000 physical pages, 4096 blocks; space over-provisioning 15.5%; user addressable pages 13,520,000.

(e). System is preconditioned with uniformly distributed random logical address patterns, and the simulation is performed with random writes having the hot/cold data ratio indicated. An asterisk suggests a possible choice of parameters.

Since the specific performance will depend on details of the garbage collection algorithm, the size of the portion of the memory system being managed and similar factors, the results presented here are merely indicative of the improvement in WA performance that can be achieved when the hot/cold nature of the stored data is taken into account when garbage collection is performed. In a large memory system, where some higher level process tends to distributed the write operations over a considerable number of blocks of pages, die or memory modules, the rate of change of hot/cold ration will ordinarily not be abrupt, and the system and method herein may maintain an average WA that is relatively steady state.

Other heuristics may be used and may be similarly evaluated and adjusted to achieve beneficial improvements in the WA factor.

When methods are described, and a listing of steps to be performed is given, it should be understood that the ordering of the steps is illustrative and steps the method may be combined, omitted, reordered, repeated or the like without departing from the teachings of the disclosure. Similarly, in the claims, any use of letter or numerical identification of clauses is for clarity in description and does not imply a restriction on the sequence of performance of the steps in the method.

Although the present invention has been explained by way of the examples described above, it should be understood to the ordinary skilled person in the art that the invention is not limited to the examples, but rather that various changes or modifications thereof are possible without departing from the spirit of the invention.

What is claimed is:

1. A method of using a processor to manage a flash memory, comprising:

allocating a first number of blocks of the flash memory to store user data and a second number *of* blocks of the flash memory as an erased block pool, each block of flash memory comprised of a plurality of pages for storing data;

maintaining a garbage collection parameter *for a block,* comprising at least an age parameter and a staleness parameter *for the block*, where the age parameter is representative of a number of times [data in] any block of the first number of blocks of memory has been erased since a last time [data in] the block has been erased, and a staleness parameter represents a number of stale (invalid) pages of the block; and, when an erased block is needed to replenish the erased block pool, selecting, *for garbage collection,* a block from the blocks storing data having a highest garbage collection parameter value[for garbage connection];

determining a hot or cold status of the block being garbage collected by computing a heuristic value, and when the block is garbage collected, all valid data of the block is designated to be either hot data or cold data based on the heuristic value of the block, *wherein hot data is data that is frequently modified and cold data is data that is not frequently modified*;

maintaining a first write stream, a second write stream and a third write stream, such that data from the each of the first write stream, the second write stream and the third write stream is written to separate blocks of the flash memory[by a flash translation layer];

inserting user written data in the first write stream, hot data in the second write stream and cold data in the third write stream;

determining if a free page location is available for writing data of each of the first write stream, the second write stream or the third stream;

if no free page location is available for a selected stream of the first write stream, the second write stream or the third write stream, selecting a block of memory from the erased block pool and associating the [erased] block of memory *from the erased block pool* with one of the streams requiring page locations for writing the data;

if a page is available for writing the data, continue writing data from the stream until no page location is available;

determining if a number of erased blocks in the erased block pool has been reduced to a predetermined number, and if this predetermined number is reached, selecting the block of memory from the blocks of memory storing data having a highest garbage collection parameter for *the* garbage collection;

moving each valid page of data from the block being garbage collected to *either* the second write stream or the third write stream, depending on whether the block was determined to be hot or cold respectively, until all valid data has been moved from the block;

erasing the block; and allocating the erased block to the erased block pool.

2. The method of claim 1, wherein the age parameter is an index [for each block] whose value is initialized [for each block] when the block of the plurality of blocks of the free block pool is allocated to receive data from one of the first write stream; the second write stream or the third write stream, and an index is incremented each time any block of the first number of blocks of the flash memory is erased.

3. The method of claim 1, wherein the staleness parameter is an index whose value is set to a predetermined value when the block of the plurality of blocks of the free block pool is allocated to receive data from one of the first write stream, the second write stream, or the third write stream; and the index is incremented each time a status of a page of the block is changed from valid to invalid (stale).

4. The method of claim 1, wherein the [garbage collection parameter] *heuristic value* is [a product of] *based on at least* the age parameter and the staleness parameter.

*5. A system comprising:*

*a processor; and*

*a flash memory comprising blocks of memory, wherein each of the blocks or memory comprises a plurality of pages for storing data;*

*the processor is configured to allocate a first number of blocks of the flash memory to store user data and a second number of blocks of the flash memory as an erased block pool;*

*the processor is configured to maintain a garbage collection parameter for a block, comprising at least an age parameter and a staleness parameter for the block, where the age parameter is representative of a number of times any block of the first number of blocks of memory has been erased since a last time the block has been erased, and a staleness parameter represents a number of stale (invalid) pages of the block; and,*

*the processor is configured to select for garbage collection, when an erased block is needed to replenish the erased block pool, a block from the blocks storing data having a highest garbage collection parameter value;*

*the processor is configured to determine a hot or cold status of the block being garbage collected by computing a heuristic value, and when the block is garbage collected, the processor is configured to designate all valid data of the block to be either hot data or cold data based on the heuristic value of the block, wherein hot data is data that is frequently modified and cold data is data that is not frequently modified;*

*the processor is configured to maintain a first write stream, a second write stream and a third write stream, such that data from the each of the first write stream, the second write stream and the third write stream is written to separate blocks of the flash memory;*

*the processor is configured to insert user written data in the first write stream, hot data in the second write stream and cold data in the third write stream;*

*the processor is configured to determine if a free page location is available for writing data of each of the first write stream, the second write stream or the third stream;*

*if no free page location is available for a selected stream of the first write stream, the second write stream or the third write stream, the processor is configured to select a block of memory from the erased block pool and*

*associating the block of memory from the erased block pool with one of the streams requiring page locations for writing the data;*

*if a page is available for writing the data, the processor is configured to continue writing data from the stream until no page location is available;*

*the processor is configured to determine if a number of erased blocks in the erased block pool has been reduced to a predetermined number, and if this predetermined number is reached, the processor is configured to select the block of memory from the blocks of memory storing data having a highest garbage collection parameter for the garbage collection;*

*the processor is configured to move each valid page of data from the block being garbage collected to either the second write stream or the third write stream, depending on whether the block was determined to be hot or cold respectively, until all valid data has been moved from the block;*

*the processor is configured to erase the block; and*

*the processor is configured to allocate the erased block to the erased block pool.*

*6. The system of claim 5, wherein the age parameter is an index whose value is initialized when the block of the plurality of blocks of the free block pool is allocated to receive data from one of the first write stream; the second write stream or the third write stream, and an index is incremented each time any block of the first number of blocks of the flash memory is erased.*

*7. The system of claim 5, wherein the staleness parameter is an index whose value is set to a predetermined value when the block of the plurality of blocks of the free block pool is allocated to receive data from one of the first write stream, the second write stream, or the third write stream; and the index is incremented each time a status of a page of the block is changed from valid to invalid (stale).*

*8. The system of claim 5, wherein the heuristic value is based on at least the age parameter and the staleness parameter.*

* * * * *